Patented Apr. 13, 1948

2,439,745

UNITED STATES PATENT OFFICE 2,439,745

COMPOSITION COMPRISING CAPROLACTAM FOR PRINTING NYLON FIBER

Charles Franklin Miller, Wilmington, Del., assignor to E. I. du Pont de Nemours & Company, Wilmington, Del., a corporation of Delaware No Drawing. Application February 23, 1946,
Serial No. 649,743

8 Claims. (Cl. 8—62)

This invention relates to an improved process and composition for printing nylon fiber with direct and acid colors.

It is an object of this invention to provide an improved composition for printing nylon fabric with dyestuffs of the aforementioned classes, whereby to shorten the steam-aging period and to enable the aging to be carried out in a continuous manner, as for instance in a Mather-Platt type, rapid ager. Other and further important objects of this invention will appear as the description proceeds.

The conventional practice in printing nylon fiber with direct and acid colors is discussed by Paul L. Meunier in the American Dyestuff Reporter, vol. 31, pages 232–9. In this conventional practice, the printing paste contains, besides color, water and the customary thickening agent, a special assistant which may be urea, hydroxyacetic acid, triethanolamine or combinations of these. After printing, the fabric is aged in a cottage steamer for a period of time from 30 minutes to 1 hour. This long period of aging makes it impractical to carry out the process in a continuous or "rapid" ager.

Now according to my present invention, the above printing assistants are replaced by a special combination of assistants, comprising on the one hand caprolactam and on the other hand an ammonium salt of a polyvalent acid such as sulfuric, phosphoric or pyrophosphoric. I have found that when this special assistant-combination is employed, the aging time may be reduced to a period between 10 and 20 minutes, with the resulting advantages that—

1. The time of aging is materially reduced, thus enabling the printer to obtain greater production with less goods tied up in the process at any given time;

2. The aging process may be carried out in a rapid ager, which is a continuous operating device, whereas the cottage steamer is a batch device; thus not only is there a reduction in the time of aging but a notable economy in handling the goods, permitting much larger yardages to be handled in a given time.

While the theory of action of my special assistant-combination is obscure, the suggestion is ventured here that the ammonium salt, which may be a neutral or acid salt of the corresponding polyvalent acid, decomposes slowly in the steaming chamber, liberating acid which apparently is essential to make the nylon fiber receptive toward dyes of the direct and acid classes, whereas the caprolactam has the two-fold function of facilitating the solution or dispersion of the dye in the printing paste, and of overcoming the tendency of the mentioned ammonium salts to precipitate the dye out of solution. In any event, it will be clear that this invention is based on observations of facts, and is not intended to be limited to any particular theory of action.

Caprolactam, as used in this specification, is the inner anhydride of 6-amino-1-caproic acid. In the literature, it is sometimes designated as epsilon-caprolactam (Beilstein, 4th ed., vol. XXI, page 240). It occurs in commerce as a dry powder or as a concentrated aqueous solution (about 65%).

The proportions of the above assistant ingredients in the printing paste may vary within reasonable limits, good results being obtained for instance by using a weight of caprolactam corresponding to about 2 to 7% of the total weight of the paste, and a quantity of the ammonium salt corresponding to about 3 to 4% by weight on the same basis. The dyestuff itself may constitute from 0.5 to 3% of the weight of the printing paste, while the thickening agent may follow standard practice (about 50% by weight of the entire paste).

The steaming temperature and pressure may follow standard practice, which is usually about 212 to 220° F. at atmospheric pressure. The period of aging may be anything from 10 to 20 minutes or more, but for the sake of increased efficiency will naturally be held as near the lower limit as possible, say at from 10 to 15 minutes.

Without limiting my invention, the following examples are given to illustrate my preferred mode of operation. Parts mentioned are by weight:

*Example 1.—Printing composition*

| | Parts |
|---|---|
| Anthraquinone Green G, C. I. #1078 | 3.0 |
| Caprolactam | 4.5 |
| Ammonium sulfate | 4.0 |
| Water | 38.5 |
| Thickening (as defined below) | 50.0 |
| Total | 100.0 |

*Procedure.*—Print on nylon fabric; dry, age 15 minutes in the rapid ager (vat color ager of the Mather-Platt type), rinse soap ten minutes at 140° F. and dry. The resulting printed cloth has a green design of excellent light and wash fastness, of good brilliance and penetration, and with at least equal color value to a print made by conventional methods with urea and hydroxyacetic acid and aged 30 minutes in the cottage steamer, but stronger and brighter than such a conventional print if aged only 15 minutes in the same rapid ager.

Example 2.—*Printing composition*

| | Parts |
|---|---|
| Dark green acid dyestuff, C. I. #247 | 3.0 |
| Caprolactam | 3.0 |
| Diammonium phosphate | 2.5 |
| Water | 41.5 |
| Thickening (as defined below) | 50.0 |
| | 100.0 |

*Procedure.*—Print on nylon fabric; dry, age 15 minutes in the rapid ager, rinse, soap 10 minutes at 140° F., rinse and dry. The resultant printed design is noticeably stronger than a print which has been made with a paste containing urea in place of the caprolactam and diammonium phosphate, followed by aging and washing as in the above example.

Example 3.—*Printing composition*

| | Parts |
|---|---|
| Yellow direct dyestuff, C. I. #365 | 3.0 |
| Caprolactam (65% aqueous solution) | 9.0 |
| Ammonium sulfate | 4.0 |
| Water | 34.0 |
| Thickening (as defined below) | 50.0 |
| | 100.0 |

*Procedure.*—Print on nylon and treat further as in Example 1; the resultant printed design is noticeably stronger and more level than when triethanolamine is used as assistant.

Example 4.—*Printing composition*

| | Parts |
|---|---|
| Blue acid dyestuff, C. I. #289 | 3.0 |
| Caprolactam | 3.0 |
| Monoammonium phosphate | 3.0 |
| Water | 41.0 |
| Thickening (as defined below) | 50.0 |
| Total | 100.0 |

*Procedure.*—Print on nylon and treat further as in Example 1. The resultant print is stronger than where urea, hydroxy-acetic acid or a mixture of the two is used as an assistant and the cloth is processed in the same manner.

The thickening used in the above examples is selected from among the conventional gums such as tragacanth, British gum, karaya, methocel, crystal gum or such patented gums as are described in U. S. P. 1,990,330. The ammonium salt of phosphoric acid may be the mono-, di- or tri-derivative, or it may be a salt of one of the complex phosphoric acids as pyrophosphoric. Likewise, in lieu of diammonium sulfate, the mono-ammonium salt may be used (i. e., "ammonium-acid-sulfate").

Among other acid and direct colors that may be used to advantage with my new assistant combination are:

Silk Orange R, C. I. #234
  Red, acid dyestuff, Pr. #101
  Ruby, acid dyestuff, C. I. #179
  Yellow, direct dyestuff, Pr. #53
  Yellow, direct dyestuff, C. I. #346
  Orange II (acid dyestuff), C. I. #151
  Orange RO (acid dyestuff), C. I. #161
  Anthraquinone Iris R, C. I. #1073
  Anthraquinone Violet 3R, C. I. #1080
  Anthraquinone Rubine R, C. I. #1091
  Azo Eosine, acid dyestuff, C. I. #114
  Red, acid dyestuff, C. I. #275
  Black, acid dyestuff, Pr. #143

(The C. I. numbers in the above table refer to the well known Colour Index. The Pr. numbers are Prototype numbers, and refer to the listing in the annual Yearbooks of the American Association of Textile Chemists and Colorists; see for instance the 1944 Yearbook at pages 416–419.)

Numerous other permissible variations and modifications will be readily apparent to those skilled in the art.

I claim as my invention:

1. In the process of printing nylon fabric with a color from the group consisting of acid and direct dyestuffs, the improvement which consists of applying the color by the aid of a printing paste containing as special assistants caprolactam and an ammonium salt selected from the group consisting of the neutral and acid ammonium salts of sulfuric, phosphoric and pyrophosphoric acids.

2. A printing paste for nylon comprising a thickening agent pasted with water, a dyestuff selected from the group consisting of direct and acid dyestuffs, caprolactam, and an ammonium salt selected from the group consisting of the neutral and acid ammonium salts of sulfuric, phosphoric and pyrophosphoric acids.

3. A printing paste as defined in claim 2, the ammonium salt being an ammonium salt of a phosphoric acid.

4. A printing paste as defined in claim 2, the ammonium salt being diammonium phosphate.

5. A printing paste as defined in claim 2, the ammonium salt being monoammonium phosphate.

6. A printing paste as defined in claim 2, the ammonium salt being diammonium sulfate.

7. A process for printing nylon fabric, which comprises applying thereto a printing paste as defined in claim 2, and then subjecting the fabric to steaming in a rapid ager for a period of time not less than 10 minutes and not over 20 minutes.

8. A printing paste for nylon fabric comprising (1) a thickening agent made into a paste with water, (2) a color selected from the group consisting of direct and acid dyestuffs, (3) caprolactam, and (4) an ammonium salt selected from the group consisting of the neutral and acid ammonium salts of sulfuric, phosphoric and pyrophosphoric acids, the proportion of color being from 0.5 to 3% by weight, the proportion of caprolactam from 2 to 7% by weight, and that of the ammonium salt from 3 to 4% by weight, all weights being based on the total weight of the paste.

CHARLES FRANKLIN MILLER.

REFERENCES CITED

The following references are of record in the file of this patent:

UNITED STATES PATENTS

| Number | Name | Date |
|---|---|---|
| 1,747,107 | Niederhausern | Feb. 11, 1930 |

FOREIGN PATENTS

| Number | Country | Date |
|---|---|---|
| 568,092 | Great Britain | Mar. 19, 1945 |

OTHER REFERENCES

"Colouration of Nylon," article in Silk Journal and Rayon World for July, 1944, pages 36, 37.